United States Patent [19]

Clark et al.

[11] Patent Number: 4,633,554
[45] Date of Patent: Jan. 6, 1987

[54] METHOD FOR REPAIRING A STEAM TURBINE OR GENERATOR ROTOR

[75] Inventors: Robert E. Clark, Orlando, Fla.; Dennis R. Amos, Rock Hill, S.C.

[73] Assignee: Westinghouse Electric Corp., Pittsburgh, Pa.

[21] Appl. No.: 763,744

[22] Filed: Aug. 8, 1985

[51] Int. Cl.⁴ .................. B23P 15/00; B21K 3/00; B23K 9/00
[52] U.S. Cl. ................. 29/156.4 R; 29/156.8 R; 29/402.07; 29/402.08; 29/DIG. 48; 219/61; 219/137 R; 228/104; 228/119
[58] Field of Search ............ 29/156.4 R, 156.8 R, 29/402.07, 402.08, DIG. 48, DIG. 24; 219/61, 137 R; 228/104, 105, 119

[56] References Cited

U.S. PATENT DOCUMENTS

| | | | |
|---|---|---|---|
| 3,137,782 | 6/1964 | Rieppel et al. | 219/137 R X |
| 4,219,717 | 8/1980 | Kuhnen | 219/137 R X |
| 4,581,816 | 4/1986 | Klufas et al. | 29/156.8 R X |

Primary Examiner—Howard N. Goldberg
Assistant Examiner—R. S. Wallace
Attorney, Agent, or Firm—R. A. Stoltz

[57] ABSTRACT

This is a method for repairing low alloy steel steam turbine (both high pressure and low pressure sections) or generator rotors. The defective section of the original rotor is removed and a replacement end is used, with mating attachments machined on the replacement end and the original rotor. The inner portion of the weld joining the replacement end to the original rotor is provided by a narrow gap weld, either by gas metal or by submerged arc welding. The outer ½-2 inches of the weld is provided by gas tungsten arc welding. The mating attachment and at least the inside ¼ inch of the weld is bored out to remove possible crack initiation sites and to provide a smooth inspectable bore. In this manner, a fast and reliable technique is provided which provides accurate alignment, fast, essentially distortion free welding, and the superior mechanical properties of gas tungsten arc welding in the outer, more highly stressed zones.

6 Claims, 5 Drawing Figures

METHOD FOR REPAIRING A STEAM TURBINE OR GENERATOR ROTOR

CROSS-REFERENCE TO RELATED APPLICATION

An improved filler metal and welding technique for weld repairs to nickel-molybdenum-vanadium steel steam turbine-generator rotors is described in related application Ser. No. 06/727,175, filed Apr. 25, 1985, and assigned to the same assignee. That filler metal is the preferred material for welding low pressure steam turbine rotors and that related application is incorporated by reference herein.

BACKGROUND OF THE INVENTION

1. Field of the Invention

This invention relates to metal fusion bonding and in particular to the replacing of ends of rotors on steam turbines or generators and the aligning, welding, and inspection therefor.

2. Description of the Related Art

A frequently made rotor repair to correct a service problem involves the cutting of a defective end section off of a rotor and the welding of a new stub shaft end. The new stub shaft end can be as long as required, depending on the location of the defective section. Such repair procedure generally involves a number of special fixtures. In addition, such welding has been extremely time consuming and has resulted in excessive downtime with significant loss of revenue.

SUMMARY OF THE INVENTION

This is a repair method for steam turbine or generator rotors which provides for replacements of defective end sections, which replacement is fast, effective, and inspectable. The invention utilizes machining mating attachments (to mount and align) on the replacement end and on the remaining portion of the original rotor and mating the replacement end to the rotor, narrow-gap gas metal arc welding or submerged arc welding of the replacement end to the original rotor up to a depth of $\frac{1}{2}$ inch-2 inches below the rotor outer surface, gas tungsten arc welding the remaining $\frac{1}{2}$-2 inches of the gap between the replacement end and the original rotor, boring out the mating attachments and at least the inside one-quarter inch of the weld, and inspecting the bore at the weld location.

This technique provides for rapid welding using gas metal arc or submerged arc welding in the interior where lesser weld strength is required and gas tungsten arc welding near the outer surface where better material properties are required. The use of mating attachments allows the maintaining of alignments between the replacement end and the original rotor without excessive special fixturing and the mating attachments are bored out along with the initial portion of the gas metal arc weld or submerged arc weld material. This not only eliminates features which might lead to crack initiation, but also makes it possible to inspect the critical inner portion nearer the rotor centerline of the weld. Preferably the inner portion of the weld is made by gas metal arc welding and, after boring along the rotor centerline, the bore surface is inspected both visually and by magnetic particle inspection techniques.

BRIEF DESCRIPTION OF THE DRAWINGS

This invention can be best understood by reference to the following drawings, in which.

DESCRIPTION OF THE PREFERRED EMBODIMENT

While replacement ends could conceivably be welded on rotors using gas metal arc or submerged arc welding, the mechanical properties of welds deposited by these methods are lower than properties achieved by the gas tungsten arc welding process and are not suitable for many applications. The gas tungsten arc welding process on the other hand is relatively slow and cannot be used for narrow groove welding. The V groove required for gas tungsten arc welding would be a very wide at the top for deep welds, and thus is extremely slow for welds much over 2 inches in depth. This invention utilizes a deep narrow groove which is filled by gas metal arc or submerged arc welding and then a relatively shallow V which is filled by gas tungsten arc welding and thus provides the best weld mechanical properties at the outer surface where operating stresses are the highest. In addition, a unique method rigidly holds the two (original and replacement) portions in line during weld to minimize axial misalignment. The invention furthers bores out the mating attachments and also the inner (initial) portion of the weld to both eliminate weld porosity, common at the point of weld initiation, and also to provide a defective-free inner surface which is inspectable. This bore surface is especially critical as crack initiation at this surface can be a significant problem.

In order to make the weld joining two rotor forgings with a minimum of special fixtures and to produce a weld having optimum mechanical properties, the invention utilizes the welding of a replacement stub to the original rotor forging using a male-female spigot fit to keep the forgings rigidly and accurately held together during welding. This maintains axial and radial alignment during the start of welding until sufficient weld has been deposited. Upon completion of welding, the inside is bored along the rotor centerline out to such a diameter to a position of clean weld metal, beyond the questionable quality weld located at the root fusion area. The bore surface can then be nondestructively examined to insure bore surface quality.

Figure 1:
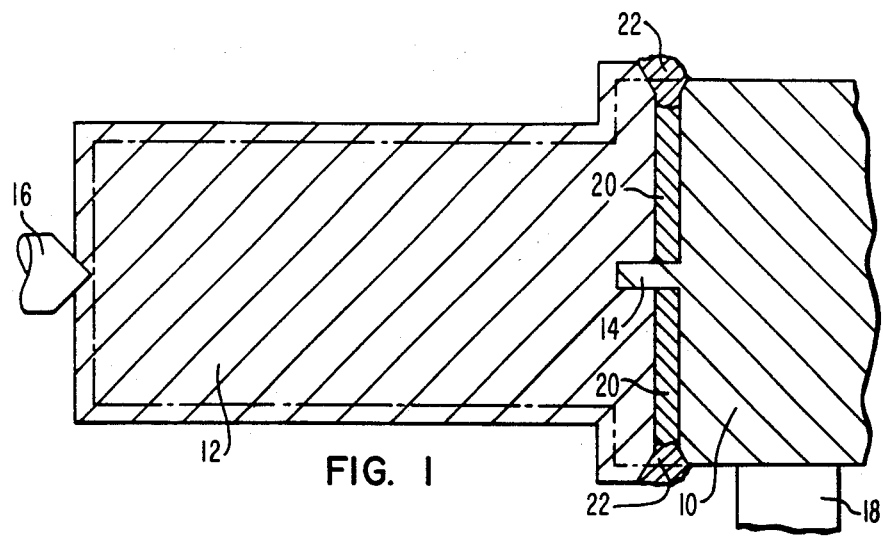
FIG. 1 is an elevation of a cross section of a rotor showing the rotor after completion of the two welding steps, but prior to the boring and finish machining of the rotor.
Figure 2:
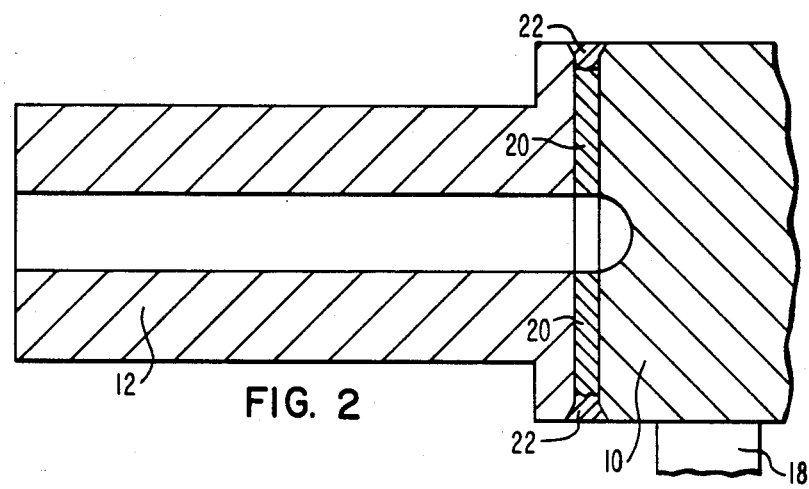
FIG. 2 shows a cross section of the rotor of FIG. 1, after final machining.
Figure 5:
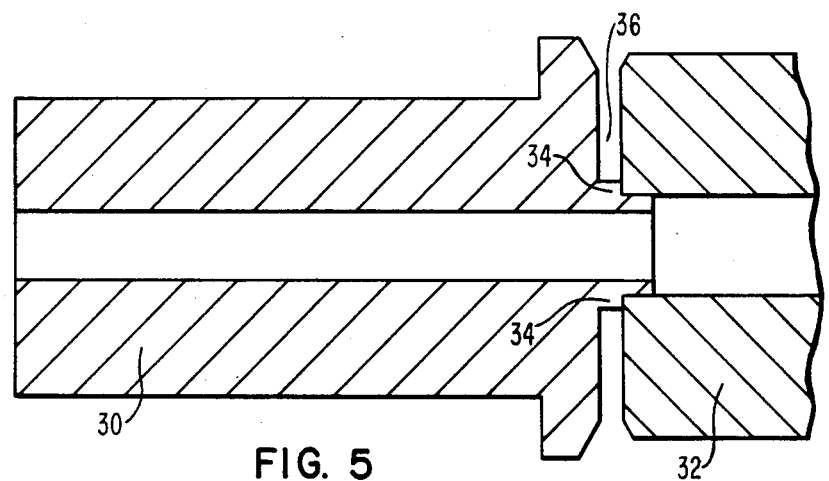
FIG. 5 shows a cross section of a configuration in which both the rotor and the replacement end stub have a hole along their centerline, this configuration being shown prior to welding.
Figure 3:
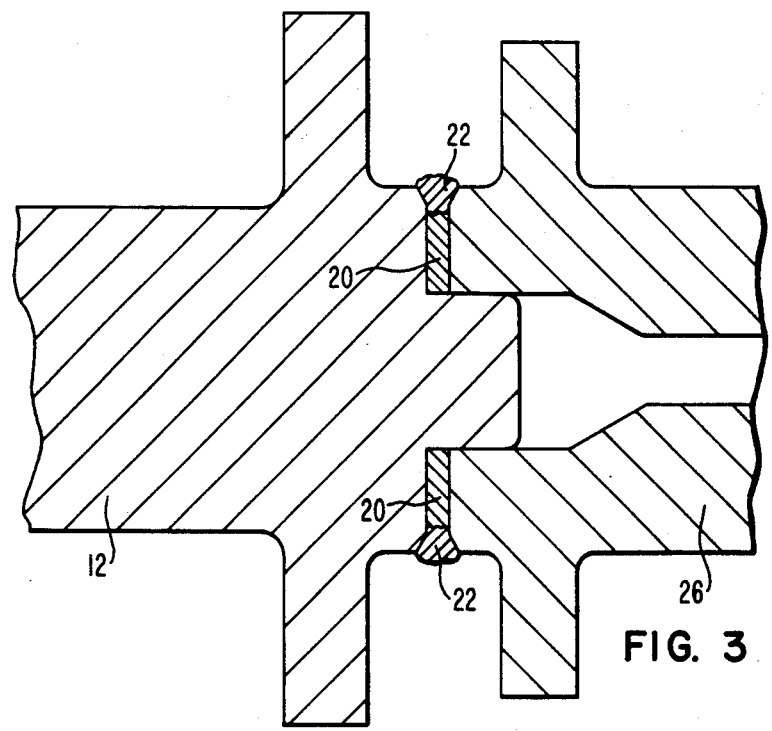
FIG. 3 shows an alternate configuration, also in cross section where the original rotor was a bored rotor, after the two-step welding of this invention but prior to final machining.
Figure 4:
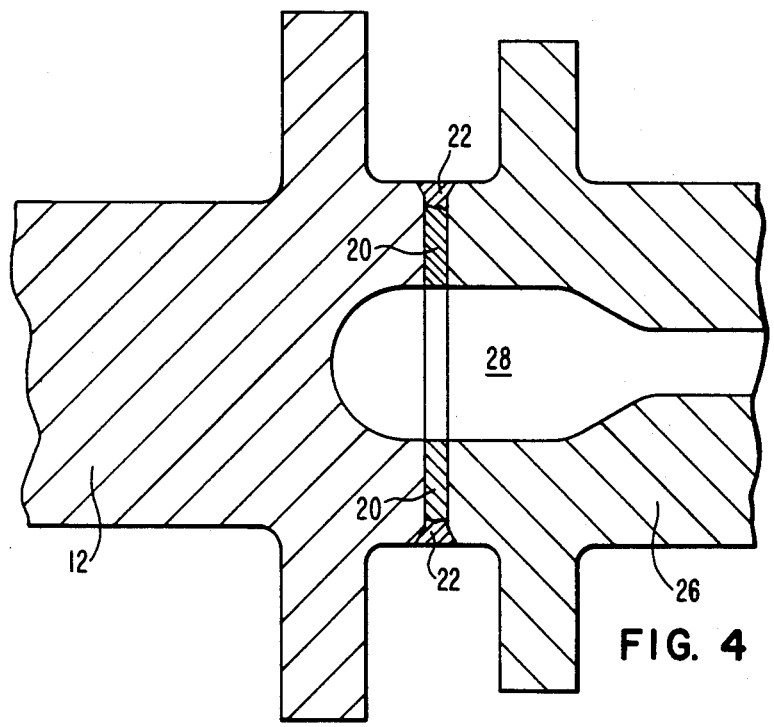
FIG. 4 shows the rotor cross section of FIG. 3 after final machining.

The invention allows the adding of a stub shaft to a rotor either with or without a bore. FIGS. 1 and 2 show the adding of a stub shaft (e.g. a boiler feedpump turbine rotor which had a cracked end portion) where the original rotor did not have a bore. FIGS. 3, 4, and 5 show two variations where the original rotor was a bored rotor.

This invention makes use of two different welding processes to insure minimal distortion during welding and optimum mechanical properties on the outer surfaces where the stresses are the highest. First the initial weld is made, starting at the bottom of the gap adjacent to the male-female spigot. This weld is made using the narrow gap, gas metal arc or submerged arc welding process. Typically the gas metal arc welding process requires a 0.4 inch wide gap for the entire weld thickness (up to, for example, 12 inches). Typically the submerged arc weld process requires a slightly wider groove. Both weld processes have good mechanical properties and nondestructive test quality, often exceeding rotor specification minimums. However, the mechanical properties of these welding techniques have some drawbacks. For the submerged arc weld, higher strength is achieved in the weld root (inner) area than the face (outer) area, with the variation typically amounting to about 10 ksi for welds in the 90–100 ksi yield strength range. This is believed to be due to more base metal dilution and/or faster cooling deep in the weld. In addition, larger grain size (as compared to gas tungsten arc welding) is obtained in submerged arc weld and gas metal arc welds, and this results in lower tensile and yield strengths. In order to improve the mechanical properties of the outer surface this invention utilizes the gas tungsten arc weld process (this is desirable, even if the gas metal arc or submerged arc weld exceed rotor specification minimums). This process is used to fill the last ½–2 inches of the weld groove (preferably about the last 1 inch). Such a 1 inch depth is preferable as the gas tungsten arc weld requires a wide angle groove rather than the narrow gap of the gas metal arc or submerged arc weld processes. The use of a deep gas tungsten arc weld would require much more weld (and hence a much greater downtime) and also would have a much greater chance for distortion. Such a deeper gas tungsten arc weld would provide only a minimal gain in mechanical properties. On the outer surface, where surface stresses are higher, the gas tungsten arc weld process offers a significant gain in properties over gas metal arc or submerged arc welding processes and provides a finer grain size with resultant higher yield and tensile strengths as well as a higher fatigue limit, better toughness (Charpy V notch impact strength), and $K_{IC}$. It has been found that stress corrosion properties of the weld and heat affected zone are improved. Thus the gas tungsten arc welding is used where its properties are required but there its disadvantages are essentially avoided, and submerged arc welding, for example, is used where the speed of its narrow gap welding can be utilized and on the interior where its better properties are obtained. (The better properties at the weld root, as compared to the weld face, are illustrated in Table I below.)

TABLE I

| | SUBMERGED ARC WELD | |
|---|---|---|
| | YS, KSI | UTS, KSI |
| Weld Face | 92 | 106 |
| ↑ | 92 | 109 |
| TO | 99 | 111 |
| ↓ | 101 | 112 |
| | 103 | 114 |
| Weld Root | 102 | 114 |

Preferably, a post weld heat treatment is selected on an individual basis to: minimize weld stresses, temper back the weld and heat affected zone hardness, prevent overtempering of the unaffected base metal, and obtain the desire weld strength. Rotors can be post weld heat treated locally at the repair weld area. This local stress relief can consist of a 360° heating of the repair area and axially along the rotor to meet requirements for axial and radial temperature gradients. These heat treating requirements can be established by shell calculations as well as thermal and finite element analyses.

It is essential that the weld quality be verifiable by nondestructive examination to assure that the quality of the weld equals or exceeds the original unwelded forged material. Several nondestructive examination techniques can be used to evaluate the weld and heat affected zone. Inspections following welding and prior to post weld heat treatment can be used to detect porosity, lack of fusion, and cracking resulting from the welding process. The post heat treatment inspection should detect flaws caused by delayed cracking or stress relief affects. Ultrasonic testing can be used both before and after post weld that treatments. Fluorescent penetrant inspection can be used on finished machine surfaces after welding for the detection of small size porosity. Fluorescent magnetic particle inspection can be used before and after post weld heat treatment (after final machining). In addition, of course, both the bore and outside surfaces can be visually inspected.

Generally the steam turbine or generator rotor is of low alloy steel, that is, it has less than 6% of alloying element. The typical alloys which have been used in low pressure steam turbine rotors and generator rotors are summarized in Table II below. In addition, chrome-molybdenum-vanadium steels are generally used in the high pressure section of steam turbines (these chrome-molybdenum-vanadium steels also are low alloy steels and can also be repaired by the process described herein).

TABLE II

FORGING ALLOYS COMPATIBLE WITH THE OPTIMIZED REPAIR METHODS

| COMPONENT | GENERIC ALLOY NAME | ASTM IDENTIFICATIONS |
|---|---|---|
| LP Rotor | 2.5 NiMoV | A470, Class 2 |
| LP Rotor | 2.5 NiMoV | A470, Classes 3 and 4 |
| LP Rotor | 3.5 NiCrMoV | A470, Classes 5 to 7 |
| LP Disc | 3.5 NiCrMoV | A471, Classes 1 to 3 |
| LP Rotor | 2.0 NiMoV | A293, Classes 2 and 3 |
| LP Rotor | 2.5 NiMoV | A293, Classes 4 and 5 |
| LP Disc | 2.8 NiMoV | A294, Grades B & C |
| Generator Rotor | 2.8 NiMoV | A469, Classes 2 and 3 |
| Generator Rotor | 3.2 NiMoV | A469, Classes 4 and 5 |
| Generator Rotor | 3.5 NiCrMoV | A469, Classes 6 to 8 |

FIG. 1 shows a portion of the original rotor 10 from which a damaged portion has been removed and a new forging 12 has been mounted by means of a male-female spigot 14, here with the male portion machined on the original portion 10 and the female on the new forging 12. Here a rotating center 16 and a roll 18 are provided such that the original forging 10 and the new forging 12 can be rotated during welding, with alignment maintained by the male-female spigot 14. The inner portion of the weld 20 is made by narrow-gap gas metal arc or submerged arc welding, while the outer portion 22 is made by gas tungsten arc welding. Both the original forging 10 and the new forging 12 are generally cylindrical in shape, and thus can be conveniently rotated about the centerline during welding. FIG. 2 shows the general configuration of FIG. 1 after final machining. The outer surface of the new forging 12 as well as the outer portion of the gas tungsten arc weld 22 have been removed, and in addition a bore 24 has been opened up through the weld zone, completely removing the male-female spigot, and also removing a portion of the gas metal arc or submerged arc weld 20. Thus the surface of the bore 24 can be preferably both visually and magnetic particle inspected, especially in the weld and heat affected zones.

FIG. 3 shows an original forging 26 where the original rotor had a bore. The new forging 12 has the male spigot fitting and the inner weld 20 again is a narrow gap weld provided by either gas metal arc or submerged arc welding. Again, the outer weld 22 is a gas tungsten arc weld. Generally the gas tungsten arc welds of this invention are performed by the cold wire method. FIG. 4 shows the configuration of FIG. 3 where a bottle boring technique has been used to provide an expanded bore in the welded region. This bottle bore is provided by inserting the tool through the bore of the original forging and a bore is not provided completely through the new forging. FIG. 5 shows a configuration, prior to welding, in which the original forging 32 had a bore and in addition the new forging 30 has a bore. In addition, the new forging has a shoulder 34 to accurately control the width of the gap 36. This gap 36 will be initially filled by narrow arc welding by either the gas metal arc or submerged arc welding method with the outer ½-2 inches (as measured from the finished outer surface of the repaired rotor) being welded by gas tungsten arc welding.

The method of this invention provides accurate attachment of a replacement end for a rotor with a minimum of special fixturing and avoids distortion that could be caused by deep groove gas tungsten arc welding. It provides the superior properties of the gas tungsten arc welding in the critical outer portion but provides for fast narrow groove welding of the inner portion. It further provides for boring out of questionable areas which could provide for crack initiation and provides a smooth and inspectable bore surface.

The invention is not to be construed as limited to the particular examples described herein, as these are to be regarded as illustrative, rather than restrictive. The invention is intended to cover all processes which do not depart from the spirit and scope of the invention.

We claim:
1. A method for repairing low alloy steel steam turbine or generator rotors, said method comprising:
 a. machining mating attachments on a replacement end and a remaining portion of the original rotor;
 b. mating said replacement end and said original rotor;
 c. welding said replacement end to said original rotor by narrow-gap gas metal arc or submerged arc welding up to a depth of ½-2 inches from the rotor surface;
 d. gas tungsten arc welding the remaining ½-2 inches;
 e. boring out the mating attachment and at least the inside ¼ inch of the weld; and
 f. inspecting said bore.

2. The method of claim 1, wherein said narrow arc welding is performed by gas metal arc welding process.

3. The method of claim 1, wherein said bore is inspected both visually and by magnetic particle inspection.

4. A method for repairing low alloy steel steam turbine or generator rotors, said method comprising:
 a. machining mating attachments on a replacement end and a remaining portion of the original rotor;
 b. mating said replacement end and said original rotor;
 c. welding said replacement end to said original rotor by narrow-gap gas metal arc or submerged arc welding up to a depth of ½-2 inches from the rotor surface;
 d. gas tungsten arc welding the remaining ½-2 inches;
 e. boring out the mating attachment and at least the inside ¼ inch of the weld; and
 f. inspecting said bore both visually and by magnetic particle inspection.

5. The method of claim 4, wherein said narrow arc welding is performed by gas metal arc welding process.

6. The method of claim 5, wherein said steam turbine rotor is a low pressure steam turbine rotor.

* * * * *